United States Patent [19]

Samson et al.

[11] Patent Number: 5,266,340

[45] Date of Patent: Nov. 30, 1993

[54] PROCESS FOR PREPARING BATTER-COATED, CHILLED FOOD PRODUCTS

[75] Inventors: Allan D. Samson, Kennett Square; William E. Bangs, Philadelphia, both of Pa.; David M. Poust, Trenton, N.J.; Frederick J. Haas, Jr., Perkasie, Pa.

[73] Assignee: Campbell Soup Company, N.J.

[21] Appl. No.: 23,473

[22] Filed: Feb. 25, 1993

Related U.S. Application Data

[63] Continuation of Ser. No. 734,393, Jul. 23, 1991, abandoned.

[51] Int. Cl.⁵ .................. A23L 1/315; A23L 1/325
[52] U.S. Cl. .......................... 426/92; 426/96; 426/291; 426/293; 426/296
[58] Field of Search .......... 426/92, 96, 289, 291, 426/293, 296

[56] References Cited

U.S. PATENT DOCUMENTS

| | | | |
|---|---|---|---|
| 3,052,545 | 9/1962 | Ducharme et al. | 426/291 |
| 3,586,512 | 6/1971 | Mancuzzo | 426/250 |
| 3,622,348 | 11/1971 | Malin | 426/293 |
| 4,068,009 | 1/1978 | Rispoli et al. | 426/291 |
| 4,199,603 | 4/1980 | Sortwell | 426/293 X |
| 4,208,442 | 6/1980 | Evans et al. | 426/296 |
| 4,218,485 | 8/1980 | Lee et al. | 426/296 |
| 4,330,566 | 5/1982 | Meyer et al. | 426/606 |
| 4,496,601 | 1/1985 | Rispoli et al. | 426/554 |
| 4,518,620 | 5/1985 | Monagle et al. | 426/291 |
| 4,675,197 | 6/1987 | Banner et al. | 426/292 |
| 4,741,933 | 5/1988 | Larsson et al. | 426/291 |
| 4,755,392 | 7/1988 | Banner et al. | 426/291 X |
| 4,764,386 | 8/1988 | Bernacchi et al. | 426/293 |
| 4,767,637 | 8/1988 | Ek | 426/291 |
| 4,943,438 | 7/1990 | Rosenthal | 426/296 X |

FOREIGN PATENT DOCUMENTS

| | | | |
|---|---|---|---|
| 0091497 | 10/1983 | European Pat. Off. | 426/293 |
| 2185874 | 8/1987 | United Kingdom | 426/289 |

*Primary Examiner*—Arthur L. Corbin
*Attorney, Agent, or Firm*—Robert F. Zielinski

[57] ABSTRACT

The present invention uses a cold temperature activated batter composition to coat chilled portions of a food substrate. The latent cold temperature of the chilled food, which is preferably fish, is in the range of approximately −10° to 38° F. and activates the batter so as to cause it to gel or set on the food portions. As a result, the batter coating adheres evenly and uniformly to each food portion. After coating with the batter, the chilled food portions may also be coated with a toasted bread crumb mixture, before the batter sets, to form a bread coating mixture, in-situ, on the chilled food portions. The bread crumbs may also include flavored oils derived from frying battered and fried fish or fried battered and breaded chicken in vegetable oils for the purpose of imparting savory and fried food flavor characteristics to the non-fried food.

11 Claims, No Drawings

PROCESS FOR PREPARING BATTER-COATED, CHILLED FOOD PRODUCTS

This application is a continuation of application Ser. No. 07/734,393 filed Jul. 23, 1991, now abandoned.

FIELD OF INVENTION

This invention pertains to coated foodstuffs having the taste, texture and appearance of fried foods, but which have not been fried. Specifically, the present invention pertains to novel methods of preparing battered and breaded fish fillets and fish sticks and chilled, cooked chicken and to novel batter compositions useful in the invention. The present invention also pertains to vegetable oils which have fried and savory flavors that enhance the organoleptic qualities of the battered and breaded fish and chicken on which these oils are used.

BACKGROUND OF THE INVENTION

The deep frying of foods is well known. Typically, foods such as fresh chicken, frozen and fresh fish, or fresh and frozen vegetables are cut-up, dusted with a flour mixture, dipped in a flour based batter and then deep-fried in animal fats or vegetable oils, or combinations of these fats and oils, which have been heated to temperatures suitable for frying. Typically, the battered foods are also coated with a bread crumb mixture prior to frying. During frying, the food and the coating are cooked by the exchange of heat from the heated oil to the colder food.

While consumers often prefer the taste, texture and appearance of fried foods, the actual frying process is often messy due to the spattering of the oils in which foods are fried. Frying may therefore be considered somewhat inconvenient. Moreover, it has been recognized that certain disadvantages result in cooking foods in this manner. In particular, in deep-fat frying, the fat or oil in which the food is fried remains at least partially on the food and the result can be a "greasy" feel or taste to the food which is not desirable. Furthermore, there are certain health considerations due to the presence of such added fats and oils in terms of dietary considerations as well as physiological consequences of fats and oils being part of the food intake. Further still, the fats and oils in which such products are fried have limited fry lives and they may pick up off flavors or become oxidized or rancid and must, therefore, be periodically changed or elaborately processed for reuse.

In commercially prepared fried food products which are intended to be reheated by the consumer, the messiness of preparing such products may be avoided; however, the products are still fried and typically include substantial amounts of added fat in the form of oils which remain on the fried coating. The oil which remains adds significant calories to the coated, fried product. Moreover, in a commercial context, the frying of foods often presents difficulties in preparing acceptable coating compositions which provide uniform coating thicknesses and which sufficiently adhere to a product on which the coating is applied. The problems arise in that when coated foods are fried, the coating and the coated food, such as fish, cook at vastly different rates. This problem is particularly aggravated when the temperature differential of the substrate and the coating is extreme, such as the case when coating fish portions cut from a frozen block of fish. Moreover, the coatings typically have high moisture contents which, when superheated by the frying oil form steam and may cause the coating to 'explode' off of the fish. Furthermore, as the fish is cooked, its moisture will be driven off at a different rate than the coating and the fish will shrink away or otherwise withdraw from the coating. The result of these effects is that portions of coated fish will have uneven coatings, some portions will have no coating at all and some will have coatings with 'air gaps' between the fish and the coating. As the fish is cooled and further processed, the uneven coating has a tendency to flake or otherwise come off of the fish. Where there are concentrations of coatings or where there are 'air gaps' between the coating and the fish, consumers often bite into the product expecting fried fish but, to their disappointment, encounter only fried batter. The cumulative effect of these problems is often considerable quantities of fried fish which is commercially unacceptable or otherwise substandard.

While there have been attempts to provide desired fried attributes in non-fried products, these attempts have met varying degrees of success. These products and processes may involve the addition of high fat coatings or considerable amounts of shortening and other fats which are incorporated into a batter mixture and which when cooked essentially "fries" the coating, which may also typically include a bread crumb mixture, in situ. These processes and the products have obvious disadvantages in that the total amount of fat present even after avoiding the frying step is only slightly less than if the products were actually deep-fat fried. Examples of such high fat coatings are disclosed in U.S. Pat. Nos. 4,755,392 and 4,675,197 to Banner et al.

In recognition of changing dietary preferences, other attempts have been made to produce improved, lower fat foodstuffs which have the appearance, texture and taste of fried foods, but which have not been fried. Typically, in the case of fish and seafood based foodstuffs, which are intended to be reheated by the consumer in microwave or conventional ovens, fish fillets or sticks are cut from a processed and formed fish block. After preparation, the fish portions are typically pre-dusted, battered and cooked, either partially, or to completion, frozen and then packed.

For example, U.S. Pat. No. 4,943,438 to Rosenthal teaches the use of edible oils which may be sprayed or atomized onto the surface of a baked food product. The baked food product is exposed to high temperature heating for purposes of browning and crisping the bread crumb coating. The addition of the edible oil is for improving the ultimate mouth feel of the bread crumb coating by improving its texture. Although it includes less fat than a deep fried product, even Rosenthal involves the addition of considerable amounts of fats in the bread crumb batter which forms part of the bread crumb coating.

Other examples of attempts to produce fried-like coatings are disclosed in the following patents: U.S. Pat. No. 4,496,601 to Rispoli et al.; U.S. Pat. No. 4,218,485 to Lee et al.; U.S. Pat. No. 4,208,442 to Evans et al.; U.S. Pat. No. 4,199,603 to Sortwell; U.S. Pat. No. 3,586,512 to Mancuzzo; and U.S. Pat. No. 4,330,566 to Meyer et al.

These coatings have varying degrees of success in producing a product which is acceptable to the consumer. While they may be more conveniently prepared than fried foods, some of these coatings provide only the 'oily' feel in the mouth which is associated with fried foods, while others provide only a limited 'crispy' texture that frying imparts. Significantly, none of these coatings provide the natural savory and fried flavor characteristics which complement the oily feel of crispy texture to give acceptable fried-like flavor impressions. Moreover, the problems which accompany frying batter coated fish fillets are still apparent. These problems include the differences in the rates that the coatings and the coated foods cook due to differences in moisture content and the problems with proper adhesion of the coating to fish fillets. Still problematic is the shrinkage of the coated fish away from the coating and the resultant flaking of the coating that occurs during further processing. Finally, these products are lacking in that they do not provide any of the fried flavors typically associated with deep-fat frying, nor do they provide any of the savory flavor elements such cooking imparts. Thus, the flavors of these products are organoleptically inferior to the genuine savory and fried flavors achieved by deep-frying.

From the foregoing, it can be seen that it would be desirable to provide foodstuffs which have the taste, texture and appearance of a fried food, but which have not been fried. Furthermore, it would also be desirable to provide foodstuffs which have the taste, texture and appearance of a fried food which are low in added fats and which avoid the problems not adequately solved by prior art coatings and processes. Finally, it can be seen that it would be desirable to provide non-fried foodstuffs which are organoleptically equal or superior to fried foods.

It is an object of the present invention to provide a coating for non-fried foods for the purpose of providing the taste, texture and appearance of fried foods.

It is also an object of the present invention to provide a coating for non-fried foods which have the taste, texture and appearance of fried foods and which avoid the problems associated with the coating and the coated foods cooking at different rates.

It is another object of this invention to provide a coating for non-fried foods which have the taste, texture and appearance of fried foods and which avoid the problems of the coating improperly adhering to the product.

It is a further object of this invention to provide a coating for non-fried foods which have the taste, texture and appearance of fried foods and which avoid the problems associated with the shrinkage of the cooked fish away from the coating.

Yet another object of the present invention is to provide breaded coating for non-fried foods which have the taste, texture and appearance of fried foods and which provide natural savory and fried flavors.

It is yet another object of the present invention to provide coatings for non-fried foods which have the taste, texture and appearance of fried foods by utilizing vegetable based fryer oils from other food production processes which would be otherwise discarded or which would have to be elaborately processed for re-use.

SUMMARY OF INVENTION

The present invention is concerned with coated foodstuffs, in particular, fish and seafood, which have the taste, texture and appearance of fried foods but which have not, in fact, been fried. Unlike traditional methods of preparing coated foods, in which the coatings are activated and set by the application of heat energy (i.e. cooking by baking, microwave or frying), the coatings of the present invention are activated and set by the cold temperature of the fish portions cut from the frozen and processed fish block. After portioning, the frozen fish portions are predusted with a flour mixture containing spices and a selected food grade additive. After predusting, the fish portions are dipped in a batter mixture comprising the predust and approximately 60% water which coats the fish portions. Preferably, the battered fish portions are then rolled in bread crumbs. The latent (i.e. cold) temperature from the cold fish portions activates and sets the batter onto the surface of the coated fish so that the batter fixes or adheres evenly and completely to the surface of the fish. Where bread crumbs are used, the batter fixes both on the fish and to the bread crumbs. In one embodiment of the invention, the bread crumbs may also include, between 5% to 20% by weight of the bread crumb, flavored vegetable oils derived from deep fat frying processes for the frying of battered fish or from battered and breaded chicken where chilled, cooked chicken is the coated substrate.

The vegetable based fryer oils useful in the present invention are obtained from industrial or commercial frying processes before the oils become overly oxidized or otherwise unpalatable. Preferably, the acidity of the oils remains below 1.2 and is preferable in the range of 0.6 to 0.8. Preferably still, these oils are partially fined or filtered as they are used in the fryer and before they are used as disclosed in the present invention.

The present invention is also concerned with imparting a crisp, browned, fried and savory flavored surface to bread-coated foodstuffs which are cooked, predusted, battered, and breaded and which may be further processed and, ultimately, cooked or reheated for consumption by the consumer.

DETAILED DISCLOSURE OF THE INVENTION

The preferred embodiment of the present invention is used to coat fish portions cut from an uncooked, preformed, processed, frozen fish block. After portions are cut from the fish block, they are predusted and coated with a cold temperature activated batter. The latent cold temperature of the chilled fish, which may range from approximately $-10°$ to $38°$ F., activates the batter so as to cause it to gel or set-up on the fish portions and, as a result, the coating adheres evenly and uniformly to each fish portion. In one preferred embodiment, after coating with the batter, the frozen fish portions are further coated with a toasted bread crumb before the batter sets, to form a bread coating mixture, in-situ, on the frozen fish portion. The bread coated fish product, which at this stage has the appearance of being cooked but which is, in fact, completely raw, is thereafter completely frozen and further processed for distribution and, ultimately, cooking or re-heating and consumption by the consumer.

Although the preferred product on which the cold temperature setting batters of the present invention are used include chilled fish portions, where the temperature range is typically from $-10°$ F. to $38°$ F., other food products on which these cold temperature setting batters may be applied include, chilled fish fillets, chilled seafood, chilled macerated fish and seafood, and cooked and chilled poultry, such as preformed chicken patties and/or nuggets.

Known prior art batters useful in coating fish and seafood are typically set by the application of heat. The present invention provides a departure from known prior art coatings, in that the batters used are set by the latent cold temperature of the chilled fish, thereby eliminating the batter and coating problems long associated with fried foods, parfried foods and with other batter coated foods. The predust and aqueous batters of the present invention contain functional adhesives such as vegetable proteins, flour starches and modified food starches which, at low temperatures, set or gel completely without the need for extrinsic heat energy. These functional food grade adhesives include protein adhesives such as vital wheat gluten, and a modified starch adhesive.

In the broadest embodiment of the present invention, chilled fish portions, cut from a processed frozen fish block are tempered in a cold water bath. After tempering, the fish portions were patted dry and dusted with a flour based predust containing spices and one or more food grade adhesives. In the preferred embodiment, the predust composition comprises 35% hard wheat flour, 20% soft wheat flour, 20% white corn flour, 7% whey, 5% modified food starch, 5% dextrose, 3% baking powder, 3% vital wheat gluten and the remainder, spices. However, the following ranges are also acceptable (all percentages are by weight unless designated otherwise):

20-40% hard wheat flour;
10-30% soft wheat flour;
10-30% corn flour;
5-15% whey;
3-25% modified food starch;
0-10% dextrose;
0-5% baking powder; and
0-5% spices.

The preferred modified food starch is BatterBind ® S brand starch, available from National Starch Company, Bridgewater, N.J.

In a preferred embodiment, the chilled predusted fish portion was coated with a batter comprised of the predust mixture and water. The preferred composition of the batter is 60% water and 40% predust mixture; however, acceptable batters may also be prepared with water in the range of 40% to 85%, depending on the batter formulation and the thickness of the coating desired. In one preferred embodiment, the batter coated fish portions were further coated with a bread crumb mixture before the batter was fixed or set on the fish. In yet another preferred embodiment, the batter coated fish portions were coated with a bread crumb mixture which included varying amounts of a vegetable based, fish flavored oil derived from the deep frying process for battered and fried fish.

In the selection of functional ingredients used the predust and batter formulations for the non-fried foodstuffs of the present invention, two key factors were considered. First was the performance of the batter in the battering process with reference to batter flow and viscosity, batter coverage, batter adhesion and the rate at which the batter fixed both on the chilled fish and on the breading as the batter set. The second factor was the characteristics of the batter on reconstitution with regard to batter taste, texture of the coating and adhesion of the batter to the substrate, particularly, to the fish after it has been cooked. Problematic in this regard is the high moisture content of the fish substrate which when cooked will cause the moisture to migrate from the fish and into the coating and into the crumb, and the resultant shrinkage of the fish meat as the cooking takes place. It has been found that wheat and corn flour mixtures have excellent gelling properties at temperatures typically encountered when processing chilled fish. The combination of these flours with the preferred food starch provides a predust and batter which have high moisture retention properties and which form a protein and starch matrix which significantly reduces water migration from the fish into the coating, thus reducing the amount of shrinkage typically encountered. The predust and batter of the present invention provide firm, crisp, continuous coatings with good adhesion and binding properties and excellent moisture retention properties upon cooking.

In one embodiment of the present invention, flavored vegetable oils derived from deep frying processes for battered and fried fish were applied to bread crumbs which formed part of the coating of the fish portions. On the coated product, the bread crumb is approximately between 15% to 20% of the total weight of the batter coated and breaded fish portion. The preferred bread crumbs were of the extruded type and were toasted prior to use.

For generating the desired savory and fried fish flavors, frying oil was removed from continuous industrial processes for frying battered and fried fish or battered and breaded chicken. For fish, the preferred batter was wet or English-style batter. For chicken, the preferred batter is a flour based batter and a bread crumb coating. When the acidity of the frying oil was between 0.6 and 1.2, or after the oil has been in use in the continuous frying process for approximately 4 to 10 hours, between 30% to 50% of the oil was removed and maintained at a temperature of approximately 70° to 125° F. to yield a 'flavored oil'. An equivalent amount of fresh oil was then added to the continuous fryer apparatus to replace the oil that was removed and the process was repeated. It is essential that the acidity of the fryer oils, and therefore, the flavored oils removed for flavor enhancement be maintained below 1.2. Preferably still, the acidity should be approximately 0.6 to 0.8. The suspended solids should also be approximately 1% to 10% by weight of the flavored oil, preferably, from 2% to 6%.

The generation of savory and fried flavors in vegetable based frying oils during the frying process is believed to occur due to a combination of factors. These factors include, in part: 1) the leaching of fats, fatty acids, esters and other flavor constituents from the substrate into oil during frying; 2) the Maillard Reaction of the batter components as the frying process occurs and 3) the caramelization of suspended solids such as batter, bread crumbs and particles of the foodstuffs being fried. The oils which are useful for providing flavor characteristics in the process of the present invention typically have the following profile: they have significantly higher acidity levels than fresh oils which have not been used for frying; they possess a light golden to dark brown color, depending on the temperature of the fryer and the rate of oil removal; they have a suspended solid content of 2% to 6% depending on the coating system and the effectiveness of the filtration system; and they possess recognizable savory components characterized by the product that was fried in it. Advantageously, the flavored oils used in the present invention have only minute amounts of saturated fats when compared to animal fat based frying oils and furthermore, have no deleterious cholesterols or other unhealthy congeners which such animal fat based frying oils possess.

As used herein, the term 'savory flavor' refers to the pleasant and recognizable flavor notes typically associated with the taste and aroma of a particular food as a result of cooking (i.e. fish flavors associated with fish, chicken flavors associated with chicken). The term 'fried flavor' as used herein refers to those flavor notes typically imparted by the frying of food.

The flavored oils were incorporated into bread crumbs which form part of the coating of the fish. The oils were mixed with the crumbs in a ribbon mixer before the crumbs were used in the coating, although, it is also practical to spray the oils onto the finished product after it is coated. Typically, the oil content of the crumbs ranged from 1 to 22% by weight of the crumb, with the upper limit being determined by flow or mechanical difficulties with processing the crumb which occur when the oil content exceeds roughly 25% by weight of the crumb.

The preferred oil for use in generating flavored oils is one which is relatively bland or not strongly flavored and one which is able to withstand the temperatures typically utilized in frying foods, such as a mixture of soybean and corn oils. Other suitable commercially available oils include vegetable fats and oils such as sunflower, rapeseed, low erucic acid rapeseed, canola, cottonseed, safflower, olive, nasturtium seed, tiger seed, ricebran and wallflower and, nut fat oils, such as palm, palm kernel, babassu, or peanut, as well as mixtures of these oils. Vegetable oils which are highly flavored, such as sesame and coconut, may also be used; however, it is preferred that such oils be stripped and deodorized as is known in the art, before they are used in the present invention.

EXAMPLES

EXAMPLE 1

Twelve frozen fish fillets weighing approximately 4 oz. each were cut from a fish block consisting of pressed and processed fish meat consisting of pollack and cod fish. The fillets were deglazed by dipping in a cold water bath, patted dry and dusted with the preferred predust mixture. After predusting, the chilled fillets were dipped in a prepared batter made from the predust formulation and approximately 60% water and 40% predust mixture. The latent temperature of the chilled fish portions caused the batter to fix or set in place on the fish portions. After the batter was set, the coated fish portions were re-frozen and packed.

Upon cooking in a preheated conventional oven at, the fish portions were observed to be coated uniformly and evenly with cooked batter. There were no 'air gaps' or uneven concentrations of cooked batter, nor was there any observed flaking of the batter from the fish.

EXAMPLE 2

Twelve frozen fish portions weighing approximately 4 oz. each were cut from a fish block consisting of pressed and processed fish meat consisting of pollack and cod fish were treated in the manner set forth in Example 1. After the fish portions were coated with batter, but before the batter was fixed, the battered fish portions were rolled in a bread crumb mixture consisting of precooked, triple toasted, extruded bread crumbs, spices and fresh vegetable oil in the amount of approximately 10% by weight of the crumb, to yield battered and breaded fish portions. The latent cold temperature of the fish portion caused the batter to fix or gel, in place on the fish and, simultaneously, on the bread crumbs. The coated fish portions were then re-frozen and packed.

Upon cooking in a preheated conventional oven at approximately 350° F. for 15 to 20 minutes, the cooked fish portions were observed to be coated uniformly and evenly with cooked batter. There were no 'air gaps' or uneven concentrations of cooked batter, nor was there any observed flaking of the batter from the fish. The fish portions were judged to have a crispy exterior and moist cooked interior, generally similar to fried fish.

EXAMPLE 3

Forty-eight frozen fish portions weighing approximately 4 oz. each were cut from a fish block consisting of pressed and processed fish meat consisting of pollack and cod fish were treated in the manner set forth in Example 2. After the fish portions were coated with batter, but before the batter was fixed, the battered fish portions were rolled in a bread crumb mixture consisting of precooked, triple toasted, extruded bread crumbs, spices and varying amounts of flavored vegetable oil, to yield battered and breaded fish portions.

The flavored oil, derived from the deep frying of battered coated fish, had an acidity of approximately 0.7 and a suspended solid content of approximately 5% by weight of the oil. The flavored oil was incorporated in the bread crumb by mixing the flavored oils onto the crumbs in a range of approximately 5 to 20%.

In this Example, twelve fish portions received bread crumb coatings having an oil content of approximately 5%, twelve fish portions received bread crumb coatings having an oil content of approximately 10%, twelve fish portions received bread crumb coatings having an oil content of approximately 15% and fish portions received bread crumb coatings having an oil content of approximately 20%. The latent cold temperature of the fish portion caused the batter to fix or gel in place on the fish and, simultaneously, on the bread crumbs thereby fixing the bread crumbs in place. The fish portions were then refrozen and packed.

Upon cooking in a preheated conventional oven at approximately 350° F. for 15 to 20 minutes, the cooked fish portions were observed to be coated uniformly and evenly with cooked batter. There were no 'air gaps' or uneven concentrations of cooked batter, nor was there any observed flaking of the batter from the fish. The fish portions were judged to have a crispy exterior and moist cooked interior, generally similar to fried fish. The aromas were similar to those of fried fish and were generally considered organoleptically superior to the fish portions of Example 2 and, in general, virtually indistinguishable from fried fish. In particular, in order of preference, the fish portions receiving flavored oil in the range from 10% to 15% were judged to have pleasant fried flavors and were slightly buttery with definite savory fish flavors. The fish portions having flavored oil contents of approximately 10% were considered to have less pronounced flavors than those having approximately 15% flavored oil. The fish portions having a bread crumb with an oil content of approximately 5% also exhibited fried and savory flavors, but, the flavor impact was less than the fish portions which incorporated higher amounts of the flavored oil.

EXAMPLE 4

Twelve fish portions of approximately 4 oz. each were prepared essentially as set forth in Example 2. After the fish portions were predusted and battered, and before the batter was fixed, the portions were rolled in bread crumb mixtures consisting of triple toasted, extruded bread crumbs, spices and predetermined amounts of flavored oil obtained from the deep-frying of batter coated fish, to yield battered and breaded fish portions. After the fish portions were coated with batter, but before the batter was fixed, the battered fish portions were rolled in a bread crumb mixture consisting of precooked, triple toasted, extruded bread crumbs, spices and used vegetable oil in the amount of approximately 10% by weight of the crumb, to yield battered and breaded fish portions. The flavored oil derived from the frying of batter coated fish had an acidity of approximately 1.4 and a suspended solid content of approximately 5% by weight of the oil. The latent cold temperature of the fish portion caused the batter to fix or gel in place on the fish and, simultaneously, on the bread crumbs thereby fixing the bread crumbs in place. The fish portions were then refrozen and packed.

Upon cooking in a preheated conventional oven at approximately 350° F. for 15 to 20 minutes, the cooked fish portions were observed to be coated uniformly and evenly with cooked batter. There were no 'air gaps' or uneven concentrations of cooked batter, nor was there any observed flaking of the batter from the fish. The fish portions were judged to have a crispy exterior and moist cooked interior, generally similar to fried fish. The aromas were considered to be predominantly fried and savory although, somewhat rancid, overcooked notes were present. The taste of fish portions prepared in this manner were generally considered inferior to fried fish and were also considered inferior to the fish portions produced in Examples 2 and 3.

EXAMPLE 5

Boneless white and dark raw chicken meat was injected with a moisture retaining and flavor enhancing solution consisting of approximately 89% water, 2% phosphate, 2% salt, 5% vegetable proteins and spices. The injected chicken meat was placed in a VeMag/-Masfen pump vacuum apparatus and vacuum stuffed into meat casings to form chicken meat tubes of approximately 24" long and approximately 4" in diameter. The meat tubes were placed in a boiling water bath where the meat was cooked sufficiently for consumption. The cooked meat was removed from the water bath, allowed to cool and was then frozen and maintained at a temperature of 0° F. or below for a minimum of 24 hours.

After freezing, the meat was tempered and deglazed by dipping in a cold water bath, sliced, to form chilled chicken patties of approximately ½" in thickness, and dusted with the preferred predust mixture. After predusting, the chilled patties were dipped in a prepared batter made from the predust formulation and approximately 60% water and 40% predust mixture. After the chicken patties were predusted and battered, and before the batter was fixed, the portions were rolled in bread crumb mixtures consisting of triple toasted, extruded bread crumbs, spices and 10% flavored oil obtained from the deep-frying of batter coated chicken, to yield battered and breaded chicken patties. The flavored oil derived from the frying of batter coated chicken had an acidity of approximately 1.4 and a suspended solid content of approximately 2% to 6% by weight of the oil. The latent cold temperature of the chilled chicken patties caused the batter to fix or gel in place on the patties and, simultaneously, on the bread crumbs thereby fixing the bread crumbs in place. The chicken patties were then re-frozen and packed.

Upon cooking in a preheated conventional oven at, the chicken patties were observed to be coated uniformly and evenly with cooked batter. There were no 'air gaps' or uneven concentrations of cooked batter, nor was there any observed flaking of the batter from the patties. The chicken patties were judged to have crispy exteriors and moist cooked interiors, generally similar to fried chicken. The aromas and flavors were considered to be fried and savory, also reminicent of fried chicken.

STATEMENT OF INDUSTRIAL UTILITY

The present invention is also useful for producing breaded foodstuffs which have the taste, texture and appearance of a fried food, but which have not been fried. The present invention is also useful for providing a method for preparing battered and breaded fish portions with a cold temperature setting batter. The method of the present invention ensures better adhesion of the batter on the product and avoids many problems associated with other products in which the batter must be cooked or otherwise heated in order to cause the batter to fix or set. The battered and breaded products of the present invention may also include the addition of flavored vegetable oils which provide savory and fried flavors.

While the present invention has been particularly described with respect to certain specific embodiments, it will be appreciated that adaptations and modifications will become apparent from the present disclosure and are intended to be within the scope of the following claims.

What is claimed is:

1. A process for preparing a food product consisting essentially of the steps of:
   (a) portioning a first foodstuff substrate;
   (b) chilling said foodstuff substrate to a temperature between −10° F. and 38° F. to form a chilled foodstuff;
   (c) coating said chilled foodstuff with a predust comprising a mixture of flours containing vegetable proteins and flour starches and a cold temperature activated modified food starch;
   (d) coating said chilled predusted foodstuff with a cold temperature setting batter consisting essentially of said predust and water while the foodstuff is sufficiently chilled to set and fix said batter from the latent cold temperature of said chilled foodstuff, and
   (e) allowing said batter to form a protein and starch matrix, which significantly reduces water migration from the foodstuff into the coating, and to gel substantially completely without the need for extrinsic heat,
   wherein the cold temperature of said foodstuff causes said batter to set in place and to fix onto said foodstuff thereby forming said food product.

2. The process of claim 1 further including the step of:
   (e) coating said chilled battered foodstuff with bread crumbs, said bread crumb coating step occurring prior to said fixing of said batter.

3. The process of claim 2 wherein said bread crumbs are extruded bread crumbs.

4. The process of claim 1 further including the step of:
   (e) coating said chilled battered foodstuff with a bread crumb mixture, said mixture formed from bread crumbs and a vegetable based fryer oil, said fryer oil having previously been used to fry a second foodstuff, said bread crumb mixture coating step occurring prior to said fixing of said batter.

5. The process of claim 4 wherein said fryer oil has an acidity between 0.6 and 1.2 and suspended solids in the amount of 1% to 10% by weight of said oil.

6. The process of claim 4 wherein the weight of said fryer oil is less than 25% of the weight of said crumbs.

7. The process of claim 6 wherein said first foodstuff is selected from the group consisting of uncooked chilled fish and cooked chilled chicken.

8. The process of claim 1 wherein said predust is comprised of a mixture of 10%–30% soft wheat flour, 20%–40% hard wheat flour, 10%–30% corn flour and 3%–25% modified starch.

9. The process of claim 8 wherein said batter is comprised of said predust composition and 50%–92% water.

10. The product made by the process of claim 8.

11. The process of claim 1 wherein said first foodstuff is selected from the group consisting of uncooked, chilled fish and cooked, chilled chicken.

* * * * *